(12) United States Patent
Wright

(10) Patent No.: US 10,822,772 B1
(45) Date of Patent: Nov. 3, 2020

(54) HYDRAULIC SYSTEMS WITH VARIABLE SPEED DRIVES

(71) Applicant: Wrightspeed, Inc., Alameda, CA (US)

(72) Inventor: Ian Wright, Alameda, CA (US)

(73) Assignee: Wrightspeed, Inc., Alameda, CA (US)

( * ) Notice: Subject to any disclaimer, the term of this patent is extended or adjusted under 35 U.S.C. 154(b) by 322 days.

(21) Appl. No.: 15/887,817

(22) Filed: Feb. 2, 2018

Related U.S. Application Data

(60) Provisional application No. 62/454,083, filed on Feb. 3, 2017.

(51) Int. Cl.
| | |
|---|---|
| E02F 9/22 | (2006.01) |
| F04B 49/06 | (2006.01) |
| F04B 49/00 | (2006.01) |
| F04B 49/08 | (2006.01) |
| F04B 49/03 | (2006.01) |
| F04B 1/2042 | (2020.01) |
| F04B 49/20 | (2006.01) |

(Continued)

(52) U.S. Cl.
CPC .......... *E02F 9/2235* (2013.01); *E02F 9/2232* (2013.01); *E02F 9/2246* (2013.01); *E02F 9/2267* (2013.01); *E02F 9/2296* (2013.01); *F04B 1/2042* (2013.01); *F04B 49/002* (2013.01); *F04B 49/03* (2013.01); *F04B 49/06* (2013.01); *F04B 49/065* (2013.01); *F04B 49/08* (2013.01); *F04B 49/20* (2013.01); *F04B 2203/1201* (2013.01); *F15B 13/04* (2013.01); *F15B 21/001* (2013.01); *F15B 21/02* (2013.01); *F15B 2211/70* (2013.01)

(58) Field of Classification Search
CPC ..... E02F 9/2235; E02F 9/2296; E02F 9/2246; E02F 9/2267; E02F 9/2232; F15B 2211/20546; F15B 21/087; F04B 49/065; F04B 49/08; F04B 49/002; F04B 1/324; F04B 49/06; F04B 1/2042; F04B 2205/06; F04B 2203/1201; F04B 49/03; F04B 49/20
See application file for complete search history.

(56) References Cited

U.S. PATENT DOCUMENTS

| | | | | |
|---|---|---|---|---|
| 3,086,365 A | * | 4/1963 | Gold ..................... | F15B 11/055 60/386 |
| 4,111,101 A | * | 9/1978 | Obiya ..................... | F03B 15/08 60/325 |

(Continued)

*Primary Examiner* — Peter J Bertheaud
(74) *Attorney, Agent, or Firm* — Kwan & Olynick LLP

(57) ABSTRACT

Provided are hydraulic systems comprising variable speed drives coupled to hydraulic pumps and methods of operating such systems. The drive speed is controlled based on the position of a hydraulic servo-control valve in order to reduce the flow through a bypass line. Specifically, the drive speed may be decreased as the valve is opening and sending a greater portion of the hydraulic fluid into the bypass line. This approach allows to reducing losses in the bypass line thereby increasing the overall efficiency of the hydraulic system. The position of the hydraulic servo-control valve may be determined using a position sensor or a flow sensor. Alternatively, the position may be estimated by increasing the drive speed and monitoring the pressure change in the hydraulic actuator. The differential pressure-speed ratio obtained during this speed increase is compared to a calibration set of values corresponding to different valve positions.

20 Claims, 10 Drawing Sheets

(51) Int. Cl.
 *F15B 21/00* (2006.01)
 *F15B 13/04* (2006.01)
 *F15B 21/02* (2006.01)

(56) References Cited

U.S. PATENT DOCUMENTS

| | | | | |
|---|---|---|---|---|
| 5,207,239 | A  * | 5/1993 | Schwitalla | B60G 17/0195 |
| | | | | 251/129.09 |
| 6,375,433 | B1 * | 4/2002 | Du | F04B 1/324 |
| | | | | 417/53 |
| 6,848,254 | B2 * | 2/2005 | Du | F03C 1/0686 |
| | | | | 60/448 |
| 6,966,967 | B2 * | 11/2005 | Curry | F04D 19/04 |
| | | | | 118/715 |
| 8,511,080 | B2 * | 8/2013 | Krajnik | E02F 9/2235 |
| | | | | 60/422 |
| 9,234,532 | B2 * | 1/2016 | Vanderlaan | F15B 7/006 |
| 2007/0166168 | A1 * | 7/2007 | Vigholm | E02F 9/2095 |
| | | | | 417/20 |
| 2016/0102685 | A1 * | 4/2016 | Chester | F15B 7/006 |
| | | | | 60/327 |

* cited by examiner

HYDRAULIC SYSTEMS WITH VARIABLE SPEED DRIVES

CROSS-REFERENCE TO RELATED APPLICATIONS

This application claims the benefit under 35 U.S.C. § 119(e) of U.S. Provisional Patent Application 62/454,083, entitled: "Hydraulic Systems with Variable Speed Drives" filed on Feb. 3, 2017, which is incorporated herein by reference in its entirety.

BACKGROUND

A hydraulic system is a drive system or a transmission system that uses pressurized hydraulic fluid to power various hydraulic machinery. Sometimes such systems are also referred to as hydraulic drive systems. A typical hydraulic system includes three main parts: a hydraulic pump, a valve, and an actuator. The hydraulic pump may be driven by any power mechanism. The valve is used to guide and control the system. Finally, the actuator, which may be a hydraulic motor or a hydraulic cylinder, is used to drive the hydraulic machinery. The hydraulic system may be an open system with the hydraulic fluid being returned by the valve back into an unpressurized tank at the end of the operating cycle. Specifically, the valve sends the fluid from the actuator into a bypass line connected to tank. Often, the hydraulic fluid is circulated through the bypass line when it is not needed in the actuator, which results in substantial power losses.

SUMMARY

Provided are hydraulic systems comprising variable speed drives coupled to hydraulic pumps and methods of operating such systems. The drive speed is controlled based on the position of a hydraulic servo-control valve in order to reduce the flow through a bypass line. Specifically, the drive speed may be decreased as the valve is opening and sending a greater portion of the hydraulic fluid into the bypass line. This approach allows to reducing losses in the bypass line thereby increasing the overall efficiency of the hydraulic system. The position of the hydraulic servo-control valve may be determined using a position sensor or a flow sensor. Alternatively, the position may be estimated by increasing the drive speed and monitoring the pressure change in the hydraulic actuator. The differential pressure-speed ratio obtained during this speed increase is compared to a calibration set of values corresponding to different valve positions.

In some embodiments, a method of operating a hydraulic system is provided. The hydraulic system comprises a variable speed drive coupled to a hydraulic pump. The method comprises determining the position of a hydraulic servo-control valve of the hydraulic system and controlling the speed of the variable speed drive based on the position. The hydraulic servo-control valve controls the flow of the hydraulic fluid from the hydraulic pump to a hydraulic actuator. Controlling the speed of the variable speed drive controls the amount of the hydraulic fluid pumped by the hydraulic pump.

In some embodiments, controlling the speed of the variable speed drive comprises changing the current speed to a level corresponding to the position of the hydraulic servo-control valve. For example, the current speed is increased if the speed level corresponding to the determined valve position is greater than the current speed. In other words, the current speed was not sufficient for the determined valve position. Alternatively, the current speed is decreased if the speed level corresponding to the determined valve position is less than the current speed. In other words, the current speed was not too high for the determined valve position.

In some embodiments, the speed level corresponding to the position of the hydraulic servo-control valve being fully closed is the maximum operating speed of the variable speed drive. In other words, if it is determined that the hydraulic servo-control valve is fully closed (and all of the hydraulic fluid is directed into the hydraulic actuator), then the current speed is changed to the maximum operating speed, if it is not already at this level.

In some embodiments, the level corresponding to the position of the hydraulic servo-control valve being fully open is the minimum operating speed of the variable speed drive. In other words, if it is determined that the hydraulic servo-control valve is fully open (and all of the hydraulic fluid is directed into the bypass line), then the current speed is changed to the minimum operating speed, if it is not already at this level. In some embodiments, the minimum operating speed is between about 1% and 10% of the maximum operating speed.

In some embodiments, the speed level follows a linear function of the position of the hydraulic servo-control. This linear function extends between the minimum operating speed and the maximum operating speed. Alternatively, the speed level follows a non-linear function of the position of the hydraulic servo-control, which also extends between the minimum operating speed and the maximum operating speed. The non-linear function may extend closer to the minimum operating speed than the linear function. Operating the hydraulic system in accordance with such a non-linear function may lead to more energy savings in comparison to the linear function. However, the linear function may be selected for operating flexibility reasons.

In some embodiments, controlling the speed of the variable speed drive comprises decreasing the speed if the position of the hydraulic servo-control valve is less than 50% of the fully closed position. This approach may be used for hydraulic systems in which the hydraulic servo-control valve may respond to the drive speed, such as power steering systems found in some vehicles. Specifically, decreasing the speed may cause for the hydraulic servo-control valve to be closed more thereby directing a smaller portion of the hydraulic fluid into the bypass line and reducing power losses.

In some embodiments, determining the position of the hydraulic servo-control valve and controlling the speed of the variable speed drive is repeated continuously at a set frequency. For example, the set frequency may be greater than 1 Hz. This repetition ensures that the hydraulic system is operated at desired operating conditions without excessive energy waste while providing sufficient power to the hydraulic actuator.

In some embodiments, determining the position of the hydraulic servo-control valve receiving output from a position sensor coupled to the hydraulic servo-control valve. Alternatively, determining the position of the hydraulic servo-control valve comprises receiving output from a flow sensor installed in an actuator line or a bypass line. For example, a system controller may use the current speed of the variable speed drive (which determined the total flowrate through the valve) and the flowrate in the bypass line to determine the valve position. Using the output from the flow sensor is one examples of indirect determination of the valve position.

Another example of indirect determination of the valve position is based on the pressure-drive speed response of the hydraulic system. In this example, the process of determining the position of the hydraulic servo-control valve may comprise operating increasing the speed of the variable speed drive and monitoring changes in the actuator pressure in response to this speed increase. Specifically, the process involves obtaining a first pressure of the hydraulic fluid in the hydraulic actuator. The first pressure corresponds to a first speed of the variable speed drive. The process then proceeds with increasing the speed of the variable speed drive from the first speed to a second speed and obtaining a second pressure of the hydraulic fluid at the location after the hydraulic pump. The second pressure corresponds to the second speed of the variable speed drive. The process then proceeds with determining a ratio of a pressure differential to a speed differential. This ratio may be referred to as a differential pressure-speed ratio. The pressure differential is a difference between the first pressure and the second pressure, while the speed differential is a difference between the first speed and the second speed. The process also involves comparing the differential pressure-speed ratio to a calibration set for the hydraulic system.

In some embodiments, the process of determining the position of the hydraulic servo-control valve further comprises, prior to obtaining the first pressure, reducing the current speed of the variable speed drive to the first speed. For example, the current speed may be the maximum operating speed of the variable speed drive. It may be reduced to a pretest speed (e.g., the first speed in this example) and obtaining the first pressure at that speed before increasing the speed back to the maximum operating speed.

In some embodiments, the speed differential using in the process of determining the position of the hydraulic servo-control valve depends on the first speed. For example, if the first speed is closer to the minimum operating speed of the variable speed drive, then the speed differential may be greater than if the first speed is closer to the maximum operating speed. In some embodiments, the speed differential is between about 1% and 25% of the maximum operating speed or, more specifically, between about 2% and 5%.

In some embodiments, the first pressure used in the process of determining the position of the hydraulic servo-control valve is the lowest pressure at the first speed prior to increasing the speed. It should be noted that the pressure inside the hydraulic cylinder may fluctuate over time even at the constant speed (e.g., the system is stabilizing from the prior speed changes, changes in actuator loading, and the like). Similarly, the second pressure may be highest pressure at the second speed after increasing the speed. For example, when the speed is increased, the pressure may peak initially and then slightly decrease. This pressure peak may be associated with the momentum in the hydraulic system and any load applied to the actuator. This peak allows for more precise determination of the valve position.

In some embodiments, the calibration set used in the process of determining the position of the hydraulic servo-control valve is one of a function or a data set. The calibration set may be a continuous set of differential pressure-speed ratio values (e.g., a function, a curve corresponding to the function or simply established by a calibration) or a set of discrete numbers. In the latter case, various approximation techniques may be used when comparing the determined ratio value to the calibrated ratio values (e.g., selecting the closest calibration value, using a linear average of two closest calibration values, and the like).

In some embodiments, obtaining the first pressure, increasing the speed, obtaining the second pressure, determining the differential pressure-speed ratio, and comparing the differential pressure-speed ratio to the calibration set are repeated for each determining the position of the hydraulic servo-control valve.

Also provided is a hydraulic system comprising a hydraulic actuator, a bypass line, a hydraulic servo-control valve, a hydraulic pump, a variable speed drive, and a system controller. The hydraulic servo-control valve is operable to control the flow of hydraulic fluid between the hydraulic actuator and the bypass line. The hydraulic pump is coupled to the hydraulic servo-control valve and operable to pump the hydraulic fluid to the hydraulic servo-control valve. The variable speed drive is coupled to the hydraulic pump and operable to drive the hydraulic pump. Finally, the system controller is operable to control speed of the variable speed drive based on position of the hydraulic servo-control valve. The variable speed drive may be an electrical motor.

In some embodiments, the hydraulic system further comprises a position sensor coupled to the hydraulic servo-control valve. The position sensor is operable to determine the position of the hydraulic servo-control valve and to communicate the position of the hydraulic servo-control valve to the system controller. In some embodiments, the hydraulic system comprises a flow sensor operable to determine flow rate of the hydraulic liquid to the hydraulic actuator or through the bypass line and to communicate the flow rate to the system controller. In some embodiments, the hydraulic system comprises a pressure sensor operable to measure pressure of the hydraulic fluid in the hydraulic actuator and to communicate the pressure of the hydraulic fluid to the system controller. In the later embodiments, the system controller is operable to determine the position of the hydraulic servo-control valve based a pressure-drive speed response of the hydraulic system.

These and other embodiments are described further below with reference to the figures.

DETAILED DESCRIPTION

Figure 1:
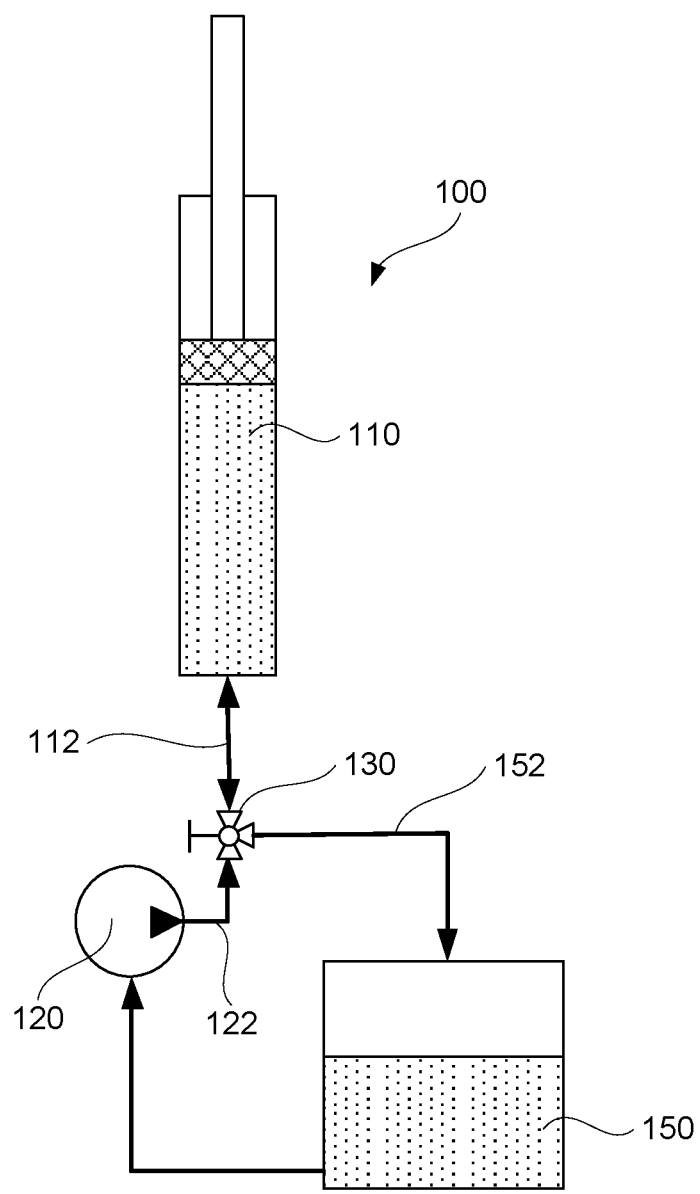
FIG. 1 illustrates a schematic diagram of a hydraulic system, in accordance with some embodiments.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting.

Introduction

Many types of machines, such as vehicles, have hydraulically operated systems and/or hydraulically boosted systems. Some examples include, but are not limited to, hydraulically boosted steering systems and hydraulically boosted brakes. Other examples of hydraulically operated equipment include various garbage pickup tools, crushers, cranes, booms, and the like.

In many conventional hydraulic systems, a hydraulic pump is driven using power supplied by vehicle's engine using, for example, a belt, gear, or shaft. The driving component may be engine's crankshaft, power take-off gear on the transmission, or some powertrain component. The speed of the hydraulic pump in such systems corresponds to the engine speed. In other words, higher engine speeds result in higher flow rates provided by the hydraulic pump. At the same time, power demand from a hydraulic system may not always correspond to the engine speed. In fact, in some examples, such as hydraulically boosted steering systems, the power demand is usually the highest when the engine speed is the lowest and vice versa. As a result, when hydraulic pumps are selected to support all operating conditions, the result is lots of power being wasted.

Furthermore, in some cases, the hydraulic pump runs all the time when the engine is running. Alternatively, a hydraulic pump may be clutched so that it can be stopped when not needed even though the engine is still running. While this clutch option allows to save some power when there is no power demand, it is not sufficient flexible to address variations in power demands together with speed variations of the driving component (e.g., engine crankshaft).

Hydraulic pumps are typically positive displacement pumps. Such pumps circulate hydraulic oil continuously while running. The flow rate of the hydraulic oil is directly related to the engine speed. These hydraulic systems are often called "open center" systems due to this continuous oil circulation. When the power is not needed, the oil is diverted back to a fluid reservoir. When power is needed, the oil is diverted to a hydraulic actuator, such as a ram, cylinder, motor, or another other device that is operable to convert the hydraulic pressure into mechanical power. Directing oil to the hydraulic actuator increases pressure in the actuator thereby allowing the actuator to perform some mechanical action, such as moving load.

Hydraulic systems may also include a pressure relief valve to limit the hydraulic pressure within the actuator when, for example, the load exceeds the system capacity. Specifically, in hydraulically boosted steering systems, the steering wheel may be turned such that one of the limit stops is reached. In this situation and without the pressure relief valve, the hydraulic pressure would rise to dangerous levels since the positive displacement pump is trying to drive oil flow into a stalled cylinder. Yet, there is no additional volume in the actuator for the oil to go into. The pressure relief valve provides a divert path to the reservoir in this case, limiting the maximum pressure to safe levels.

Some modern vehicles and other types of machines provide additional options for supplying power to hydraulic pumps. For example, electrical drives or, more specifically, electrical motors can be used to drive hydraulic pumps. The speed of the electrical drive may be at a constant level selected to provide some hydraulic pressure when this pressure is needed. For example, the electrical drive speed may be set to run the hydraulic pump continuously at a level providing the minimum flow needed for the most demanding operating condition. In this example, the hydraulic controls and pressure relief valve works similar to examples using other types of drives for hydraulic pumps as described above. The electrical drive can be stopped when is not needed in a manner similar to de-clutching the drive in other examples. In other words, the electrical drive either provides full power or no power at all. If the demand is less than maximum, some power is wasted.

These power management aspects can be illustrated with reference to a hydraulically boosted steering system equipped with an electrical drive. When the vehicle is not turning, no or very minimal hydraulic boost is required. At the same time, the electrical drive and hydraulic pump may be running at a maximum speed to provide enough hydraulic boost, for example, for an emergency steering maneuver. In this operating mode (i.e., no power demanded but the electrical motor and hydraulic pump running at the maximum speed), the hydraulic oil is circulated against some resistance in valves, hoses, and filter thereby wasting power. Furthermore, in some instances, only some hydraulic power may be needed, and this needed power may be less than the maximum power available. For example, the steering wheel may be turned very slowly. In these instances, the flow generated by the hydraulic pump coupled to the electrical motor may be too high and some of this flow may be diverted into the bypass resulting in losses.

Some hydraulic systems, such as hydraulically boosted steering systems and brake systems, may have a hydraulic servo-control valve. For example, the hydraulic servo-control valve may be built into an actuator or positioned in a line connecting the hydraulic pump to the actuator. When the steering wheel is turned or the brake pedal is pressed, the input from the wheel or the brake pedal motion operates the hydraulic servo-control valve. In response to this input, the hydraulic servo-control valve may partially (the valve is partially closed) or fully (the valve is fully closed) divert the oil flow into the actuator. When the valve is partially closed, some fluid may be still directed to a bypass line directed back to the fluid reservoir. When the valve is fully open, all fluid is directed to the bypass line.

Returning to the example where only some hydraulic fluid is directed to the actuator, if there is sufficient pressure and flow rate (collectively, power) of the fluid available, the actuator will move fast enough for a desired action to keep the hydraulic servo-control valve from completely diverting the flow to the actuator. In this case, some hydraulic fluid will continue flow into the bypass line. This bypass flow corresponds to some additional available power that is being wasted in the bypass line. In other words, when only a portion of the total hydraulic liquid flow is sufficient for the actuator to perform its function, such as moving at a desired rate, some power is wasted.

Depending on the type of a hydraulic system, the actuator movement may be reflected in the position of the hydraulic servo-control valve. Specifically, if the hydraulic power is not sufficient to move the actuator at a desired speed, the servo-control valve may be closed more to increase the flow to the actuator. This process may continue until the entire hydraulic flow is diverted to the actuator, i.e., the hydraulic servo-control valve is fully closed.

It should be noted that undesirable and even potentially dangerous operating conditions may occur when the available hydraulic power is lower than the power demand. In other words, in such situations, the hydraulic servo-control valve may divert the entire flow provided by the hydraulic pump to the actuator, but the actuator still does not move sufficiently fast. As such, the condition when the hydraulic servo-control valve diverts all flow into the actuator may need to avoided, at least for prolonged periods of time. Yet, predicting all possible power demands are difficult if possible at all. As such, most conventional hydraulic systems simply operate at excessive power levels regardless of the current demand resulting in low efficiencies and power waste.

A hydraulic system described herein addresses these issues with power losses and changes in power demands by controlling the speed of the hydraulic pump or, more specifically, the speed of the variable speed drive coupled the pump, based on the position of the hydraulic servo-control valve. One example of variable speed drives is an electrical drive or, more specifically, an electrical motor. Specifically, when more hydraulic liquid is diverted into the actuator, the speed is increased. The speed is controlled such that the hydraulic servo-control valve does not reach its fully closed limit, at which all fluid is directed to the actuator, or at least that this limit is kept for less than a set time. For example, if the hydraulic servo-control valve is at its fully closed limit, the variable speed drive may be operated at a maximum operating speed. On the flip side, as more hydraulic liquid is diverted into the bypass line, the speed is decreased. This approach allows to provide sufficient power for power demanding operating regimes without wasting much power in other regimes.

For purposes of this disclosure, 100% represents a fully closed limit of the hydraulic servo-control valve when all hydraulic fluid is directed to the actuator. 0% represents a fully open limit when no hydraulic fluid is directed to the actuator. Instead, all pumped fluid is directed to the bypass line. During power demand, the operating range of the valve may be between about 60% and 95% or, more specifically, between about 80% and 95%. Higher values represent lower power losses because of less fluid directed to the bypass line. On the other hand, the difference between these operating range values and the fully closed limit of 100% represents a safety buffer as well as a control buffer. The safety buffer may be selected depending on the application and may be greater for critical systems, such as steering and brake systems. The range may depend on dynamics of power demand, operator feedback and responsiveness, and other factors.

As such, the speed of the hydraulic pump drive may be controlled in such a way that the hydraulic servo-control valve does not reaching its fully closed limit or does not stay at this limit for prolonged periods of time. Furthermore, the speed may be controlled such that the valve may be kept as close to this fully closed limit as possible when some power is demanded (to avoid power losses). When no power is needed, which may be referred to as no power demand limit, the drive speed can be zero or some minimal operating speed. The drive speed may be kept at this zero or minimal level until the hydraulic servo-valve moves away from its fully-open position. At this point, the drive motor speed can be increased proportionally or in accordance with some other relationship between the hydraulic servo-valve position and the drive speed as further described below. As the hydraulic servo-valve approaches its fully-closed position, the drive speed may continue to increase in order to prevent the hydraulic servo-valve from reaching this fully-open position. If the demanded power is less than the available drive power, the hydraulic servo-valve should never reach its fully-open position. Alternatively, the drive speed will be at a maximum if the hydraulic servo-valve reaches its fully open limit position.

Various approached for determining the position of the hydraulic servo-control valve may be used. In some embodiments, the hydraulic system may include a position sensor positioned on the valve. The output of the position sensor is used to control the speed of the hydraulic pump drive. In other embodiments, flow rates to the actuator and/or to fluid reservoir may be compared to the drive speed to determine the valve position. In some embodiments, additional input can be used for controlling the speed drive. For example, if this hydraulic system is a part of a steering system including a steering position sensor, then the output of this sensor may be used as well. In a situation when the steering wheel position approaches its limit stop or already at a limit stop, the sensor output may be used to set the hydraulic pump drive speed to a value corresponding to the maximum operating pressure. This pressure level may close but not reaching the relief valve triggering level.

In some cases, it may be not possible to add a position sensor on the hydraulic servo-control valve. For example, previously designed and fabricated vehicles may be re-powered with electric power trains. Alternatively, manually controlled valves may be used. In these cases, a specific process can be used to determine the valve position based on the system pressure response to changes of the drive speed. Specifically, a pressure sensor may be positioned in an actuator or a line between the actuator and the hydraulic pump. The hydraulic pump drive may be dithered around its current speed, while the system pressure response is monitored. No pressure response will be observed when the valve is fully open. The pressure change (assuming the same speed change) will be higher when the valve is fully closed than when the valve is partially closed and a smaller portion of the total fluid flow is sent to the actuator.

Flow Rate, Valve Position, and Power Distribution Examples

FIG. 1 illustrates a schematic diagram of hydraulic system 100, in accordance with some embodiments. Hydraulic system 100 comprises hydraulic actuator 110, hydraulic pump 120, and fluid reservoir 150. Specifically, hydraulic pump 120 receives hydraulic fluid from fluid reservoir 150 and directs it through pump line 122 to hydraulic servo-control valve 130. Depending on the valve position, the hydraulic fluid is directed by hydraulic servo-control valve 130 to hydraulic actuator 110 and/or fluid reservoir 150. Specifically, when hydraulic servo-control valve 130 is fully closed, all hydraulic fluid is directed to hydraulic actuator 110. When hydraulic servo-control valve 130 is fully open, all hydraulic fluid is directed to fluid reservoir 150. When hydraulic servo-control valve 130 is partially closed, some hydraulic fluid is directed to hydraulic actuator 110 and some hydraulic fluid is directed to fluid reservoir 150. In this last example, amounts of hydraulic fluid directed to hydraulic actuator 110 and fluid reservoir 150 depend on the position of hydraulic servo-control valve 130, fluid resistances in actuator line 112 and bypass line 152, operating conditions of hydraulic actuator 110 (e.g., the pressure inside hydraulic actuator 110), and other factors.

Hydraulic actuator 110 is shown connected to hydraulic servo-control valve 130 by actuator line 112. In some embodiments, hydraulic actuator 110 may be connected directed hydraulic servo-control valve 130. Fluid reservoir 150 is shown connected to Hydraulic actuator 110 is shown connected to hydraulic servo-control valve 130 by bypass line 152.

When no power output is needed from hydraulic system 100, hydraulic servo-control valve 130 may be kept in its fully open position and all hydraulic fluid is directed to fluid reservoir 150. This flow of hydraulic fluid is associated with some losses in bypass line 152. These losses dependent on the flow rate (e.g., power losses may be proportional to the flow rate in bypass line 152). As such, efficiency of hydraulic system 100 may be improved when the flow rate supplied by hydraulic pump 120 is reduced during this operating mode (i.e., no power output is needed, hydraulic servo-control valve 130 is fully open).

When the full power output is needed from hydraulic system 100, hydraulic servo-control valve 130 may be kept into its fully closed position (or close to this fully closed position) and all (most) hydraulic fluid is directed to hydraulic actuator 110. This flow of hydraulic fluid is also associated with some losses in actuator line 112. However, there no losses associated with bypass line 152 (or the losses are minimal). For clarity and purposes of illustrating control and power management aspects of the proposed hydraulic system, the reference will be made to the fully closed positions when the maximum power is needed even though this limit may be rarely reached or even never reached by the system.

When a partial power output is needed from hydraulic system 100, hydraulic servo-control valve 130 may be kept into a partially closed position. In this situation, only a portion of all hydraulic fluid pumped by hydraulic pump 120 may be directed to hydraulic actuator 110 while the remaining fluid may be directed to fluid reservoir 150. This remaining fluid will be associated with some losses in bypass line 152. Interestingly, the efficiency of hydraulic system 100 may be improved when the amount of hydraulic fluid directed through bypass line 152 is reduced. It should be noted that, this bypass flow reduction should not impact or should minimally impact operation of actuator 110, e.g., the amount of hydraulic fluid directed to actuator 110. As such, the highest efficiency of hydraulic system 100 is achieved when hydraulic servo-control valve 130 is maintained at its fully closed state (or near its fully closed state from various practical considerations further described below) for any power demands. With this position of hydraulic servo-control valve 130, different power demand levels may be achieved by different pumping speeds of hydraulic pump 120.

Figure 2A:
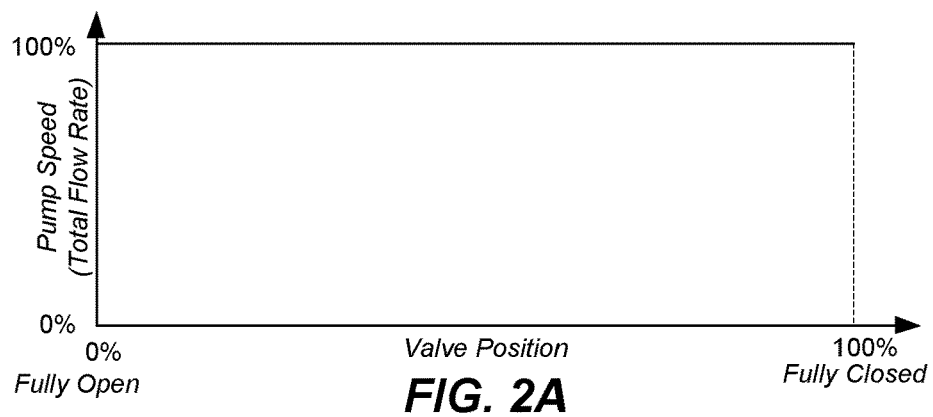
FIGS. 2A-2D illustrate plots of a hydraulic pump speed (the total flow rate) as a function of valve position for different operating regimes and examples.
Figure 3A:
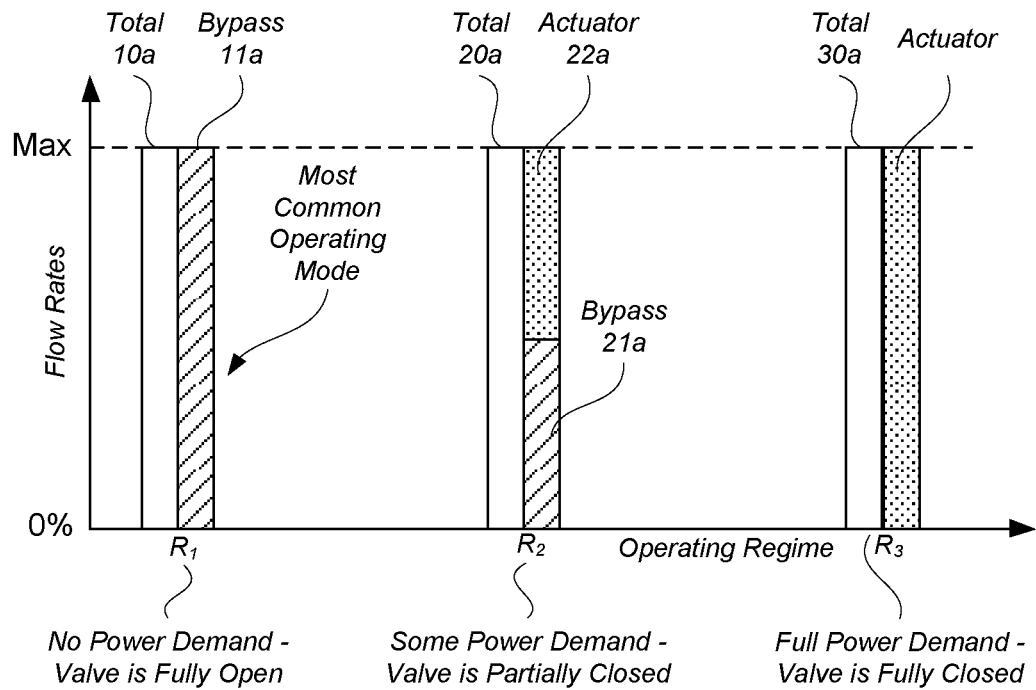
FIGS. 3A and 3B illustrate flow rates at different locations in hydraulic systems for different operating regimes and examples.

As noted above, flow rates of hydraulic fluids in conventional hydraulic systems depend on the speed of external drives (e.g., crankshafts) coupled to hydraulic pumps. The speed of these drives generally cannot be controlled based on operating conditions of the hydraulic systems. Often, the speed is maintained at a constant maximum operating level at all items in anticipation of spikes in power demand as schematically illustrated in FIG. 2A. It should be noted that the pump speed is not changed regardless of the power demand or the valve position. In fact, the valve position is used to control how much of the total pumped fluid is directed to the actuator cylinder and how of it goes into a bypass line. FIG. 3A illustrates flow rates at different locations for different operating regimes for this constant pump speed example. Total flow rates 10a, 20a, and 30a produced by the hydraulic pump are the same and at a maximum operating level for all operating regimes ($R_1$, $R_2$, and $R_3$). In the first operating regimes ($R_1$—when no power is demanded and the valve is fully open), all flow is directed into the bypass line, i.e., total flow rate 10a is equal to bypass flow rate 11a. All power transferred to the hydraulic fluid by the pump is effectively wasted. In the second operating regimes ($R_2$—when some power is demanded and the valve is partially closed), a portion of the total flow is directed to a hydraulic actuator while the remaining portion goes into the bypass line. As such, total flow rate 20a is now equal to a sum of actuator flow rate 22a and bypass flow rate 21a. Finally, in the third operating regime ($R_3$—when the maximum power is demanded and the valve is fully closed), all flow is directed into the actuator, i.e., total flow rate 30a is equal to actuator flow rate 31a.

Figure 4A:
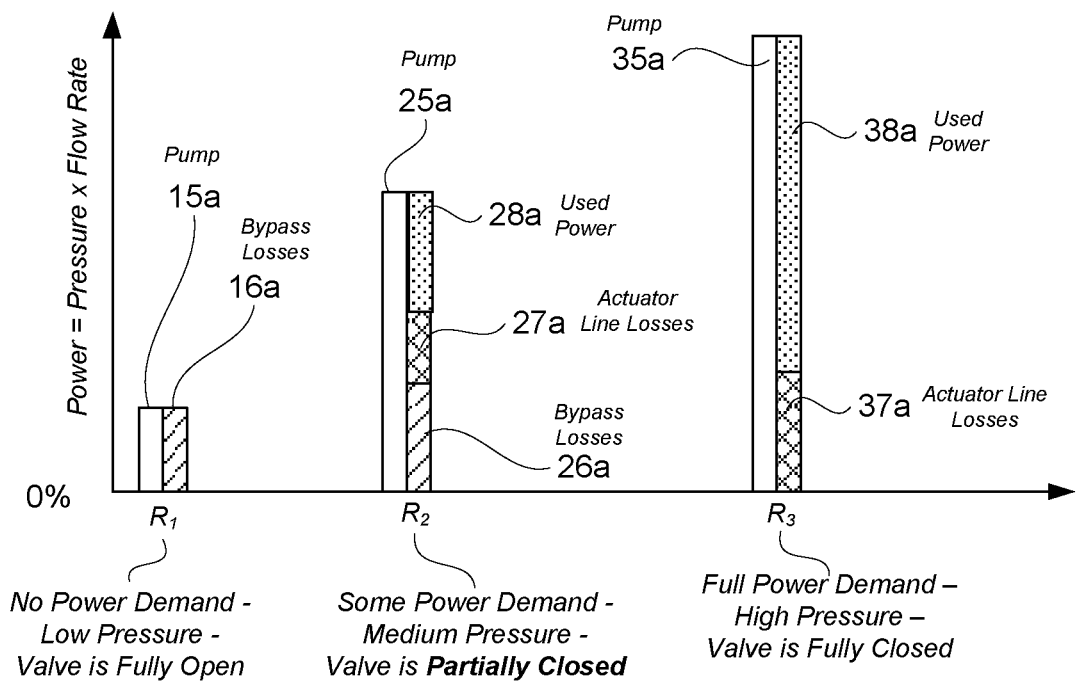
FIGS. 4A and 4B illustrate power distribution in hydraulic systems for different operating regimes and examples.

FIG. 4A illustrates power distribution for this constant pump speed example. It should be noted that power in a hydraulic system is a product of a pressure and a flow rate. The pressure may be different in different operating regimes with the lowest pressure usually corresponding to the first operating regime ($R_1$—when no power is demanded and the valve is fully open) and the highest pressure corresponding to the third operating regime ($R_3$—when the maximum power is demanded and the valve is fully closed). In the first operating regime, all pump power 15a is wasted as bypass line losses 16a. In the second operating regimes, pump power 25a is divided between used power 28a (action performed by the actuator), actuator line losses 27a, and bypass line losses 26a. Even though the bypass flow rate in this regime is lower than in the first regime, bypass line losses 26a may be greater (than bypass line losses 16a) because of the higher pressure in the second operating regime. In the third operating regime, pump power 35a is divided between used power 38a (action performed by the actuator) and actuator line losses 37a. Actuator line losses 37a in this regime are higher than actuator line losses 27a in the second regime because of the higher flow rate to the actuator and also because of the higher pressure.

Hydraulic systems described herein different from conventional systems and their hydraulic pump speeds are controlled based on positions of hydraulic servo-control valves. This variable speed approach allows to increase efficiency of the hydraulic systems by reducing the flow of hydraulic liquid through bypass line. Some examples of operating conditions in these hydraulic systems are presented in FIGS. 2B-2D, which illustrate plots of the pump speed as a function of the valve position. It should be noted that these or other like plots, functions corresponding to these plots, or even data collections including at least some data from these plots may be used for controlling the hydraulic systems described herein.

Figure 2B:
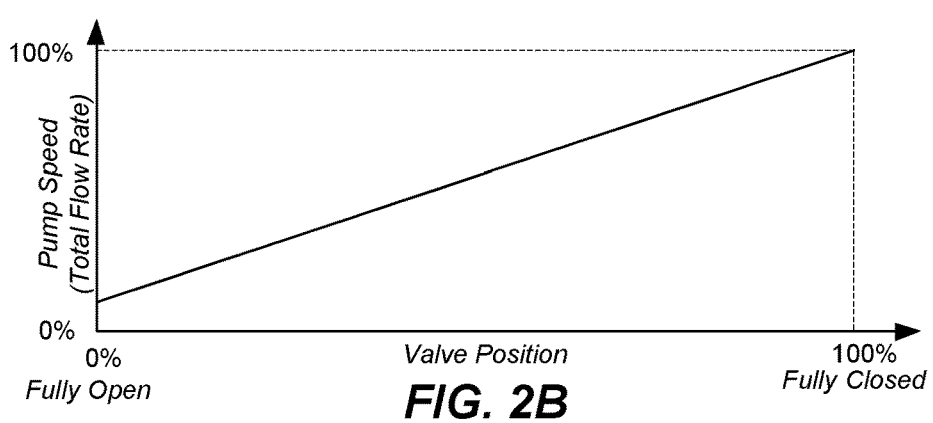
Figure 2C:
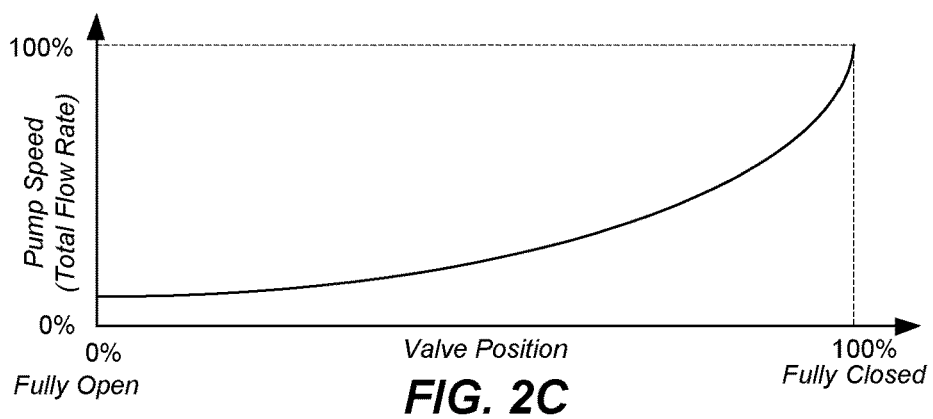
Figure 2D:
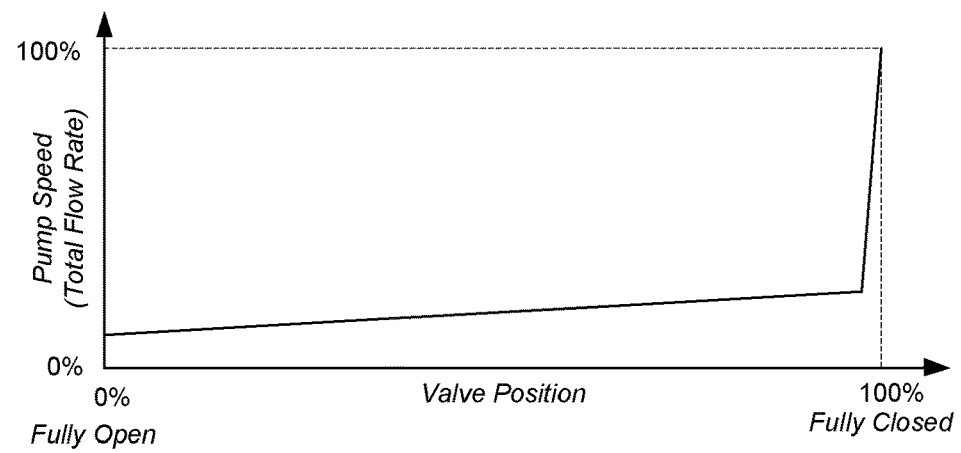

Referring to the speed-valve position plots in FIGS. 2B-2D, the pump speed may be at its a minimum or at a zero level when the hydraulic servo-control valve is fully open and all fluid is directed into the bypass line. The minimum pump speed may be used in anticipation of sudden power demand and this speed may depend on power demand dynamics and hydraulic system response. It should be noted that this minimum pump speed may be much smaller in comparison to the maximum operating speed. In some embodiments, this speed may be less than 10% of the maximum operating speed or even less than 5% of that maximum. In some embodiments, e.g., when no sudden increases in power are needed, the speed may be zero when the hydraulic servo-control valve is fully open. No or minimal flow through bypass line in this operating regime results in very small losses in comparison to conventional hydraulic systems using maximum operating flow for all operating modes including the one when the hydraulic servo-control valve is fully open or almost fully open. It should be noted that this operating regime (i.e., the hydraulic servo-control valve being fully open) is the most frequently occurring mode for many hydraulic systems. As such, very substantial energy savings are realized by substantially (e.g., 100% or close to 100%) reducing the drive/pump speed in this operating regime as further described below with reference to FIGS. 5A and 5B.

Continuing with the speed-valve position plots in FIGS. 2B-2D, the pump speed may be at its operating maximum when the hydraulic servo-control valve is fully closed. The fully closed position indicates that additional power is needed, and as a result, the speed is maximized. This is the only operating regime where the described hydraulic systems operate similar to conventional hydraulic systems. It should be noted that this operating regime (i.e., the hydraulic servo-control valve being fully closed) is very rear for most hydraulic systems and generally should be avoided.

Another operating regime is when the hydraulic servo-control valve is partially closed. This regime may be also referred to as a transition regime. In this regime, the pump speed is higher than the operating minimum but less than operating maximum. Interestingly, the transition regime represents a situation when the flow generated by the hydraulic pump is greater than the flow needed by the hydraulic actuator. As such, some of the pumped flow is directed into the bypass line resulting in some power being wasted. Considering this fact (i.e., the excess flow generated by the pump), the pump speed should be reduced and less fluid should be directed into the bypass line to avoid power losses. As such, the pump speed should be low (at least less than the operating maximum) in this transition regime.

The profile of the pump speed as a function of the valve position between its operating end points (i.e., the hydraulic servo-control valve being fully closed or being fully open) depends on power saving and operator control considerations. From the power saving considerations alone, the pump speed should be kept to its minimum until the hydraulic servo-control valve is fully closed as, for example, shown in FIG. 2D. This approach reduces flow through bypass line. However, this approach also sacrifices operator control flexibility and may be viewed as a binary type of control. In other words, up until the operator forces the hydraulic servo-control valve into its fully closed position, the minimum power will be provided to the actuator by the hydraulic pump. At the same time, when the hydraulic servo-control valve is finally in its fully closed position, the maximum power is provided. In other words, the slope and shape of the speed-valve position graphs in FIGS. 2B-2D determine how much control flexibility exists between these two operating extremes and how much power is wasted. Clearly, with more intermediate positions allowed for the hydraulic servo-control valve and more these positions are spread over a set speed range, the more control flexibility is provided for the operator. With that the speed-valve position plot of FIG. 2B will provide more flexibility than the speed-valve position plot of FIG. 2D. On the other hand, the operating regime corresponding to the speed-valve position plot of FIG. 2B is less power efficient than the operating regime corresponding to the speed-valve position plot of FIG. 2D. The plot illustrated in FIG. 2C appears in between the plots of FIGS. 2B and 2D in terms of operator flexibility and power efficiency.

Another aspect of the transition regime is that the hydraulic servo-control valve is typically controlled by an operator during this regime and the level of operator control can be very dynamic in comparison to the limit regimes (i.e., valve being fully open or valve being fully closed). Furthermore, any changes to the pump speed may cause the operator to further change his or her control instructions thereby changing the position of the hydraulic servo-control valve. This dynamic process may be ongoing.

Figure 3B:
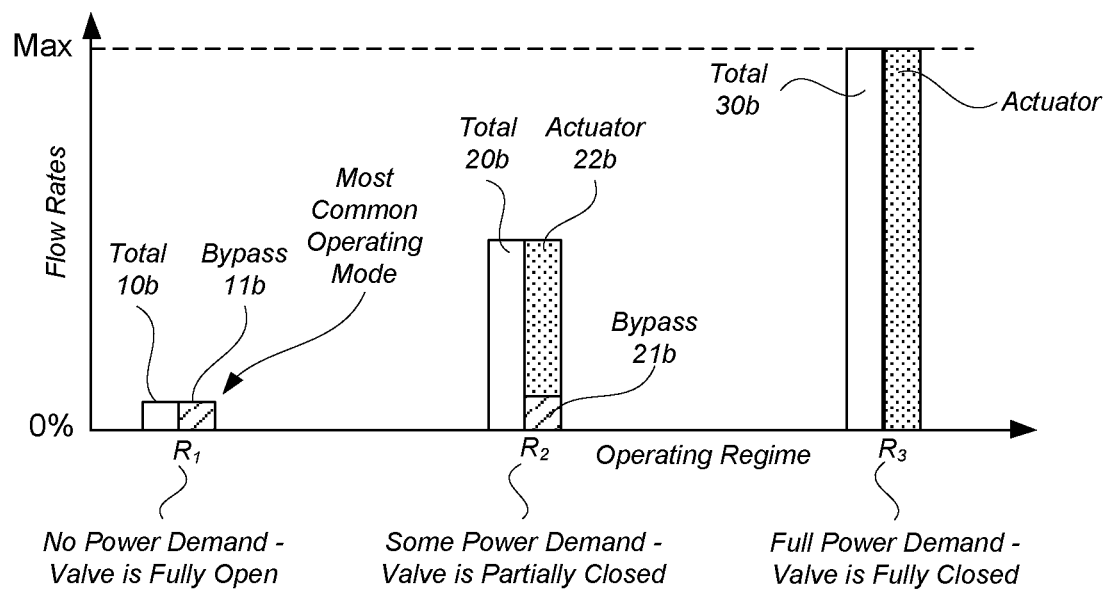

FIG. 3B illustrates examples of flow rates at different locations in a hydraulic system operating at different pump speeds during different operating modes. The speed may be controlled in accordance with one of speed-valve position plots illustrated in FIGS. 2B-2D or in accordance with some other correlations. Total flow rates 10b, 20b, and 30b are now different for different operating regimes ($R_1$, $R_2$, and $R_3$). In the first operating regime ($R_1$—when no power is demanded and the valve is fully open), total flow rate 10b is at a minimum operating level (or zero) as noted above. Even though all f the pumped flow is directed into the bypass line, i.e., total flow rate 10b is equal to bypass flow rate 11b, bypass flow rate 11b is less than for the constant flow rate example discussed above with reference to FIG. 3A. In the second operating regimes ($R_2$—when some power is demanded and the valve is partially closed), a portion of the total flow is directed to a hydraulic actuator while a remaining portion goes into the bypass line, i.e., total flow rate 20b is now equal to a sum of actuator flow rate 22b and bypass flow rate 21b. In this regime, total flow rate 20a may be also less than for the constant flow rate example discussed above with reference to FIG. 3A (total flow rate 20b<total flow rate 20a). Furthermore, bypass flow rate 21b may be also less (often substantially less) than for the constant flow rate example (bypass flow rate 21b<bypass flow rate 21a). The valve may be in a more closed position for this variable drive speed example than for the constant speed example to achieve the same flow rate to the actuator with the lower total flow rate. Again, power and energy savings are realized with the variable drive speed example over the constant speed example. Finally, in the third operating regime ($R_3$—when the maximum power is demanded and the valve is fully closed), all flow is directed into the actuator, i.e., total flow rate 30b is equal to actuator flow rate 3 1b. In this operation regime, the variable drive speed example may be the same as the constant speed example.

Figure 4B:
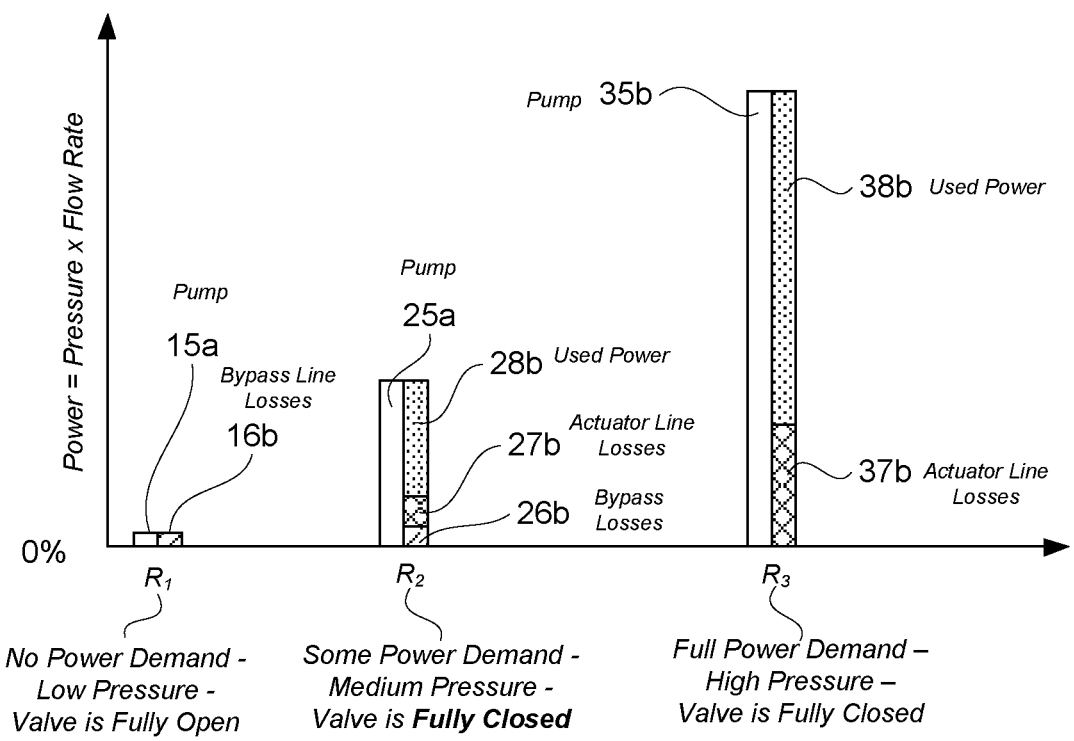

FIG. 4B illustrates power distribution in a hydraulic system operating at a variable pump speeds for the operating regimes described above with reference to FIG. 3B. In the first operating regime, all pump power 15b is wasted as bypass line losses 16b. However, because the bypass line flow rate in this example is much less than that for the constant pump speed example, bypass line losses 16b is substantially less than that for the constant pump speed example (i.e., bypass line losses 16b<bypass line losses 16a). In the second operating regimes, pump power 25b is divided between used power 28b (action performed by the actuator), actuator line losses 27b, and bypass line losses 26b. Again, because the bypass line flow rate in this example is much less for the constant pump speed example, bypass line losses 26b is substantially less than that for the constant pump speed example (i.e., bypass line losses 26b<bypass line losses 26a). In the third operating regime, pump power 35*b* is divided between used power 38*b* (action performed by the actuator) and actuator line losses 37*b*. As noted above, in this operation regime, the variable drive speed example may be the same as the constant speed example.

Figure 5A:
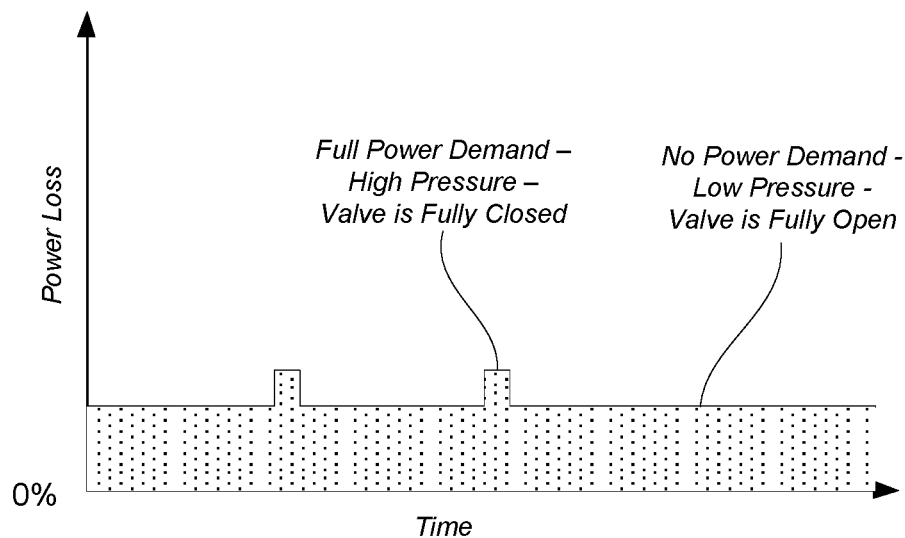
FIGS. 5A and 5B illustrate power losses over time in hydraulic systems for different operating examples.
Figure 5B:
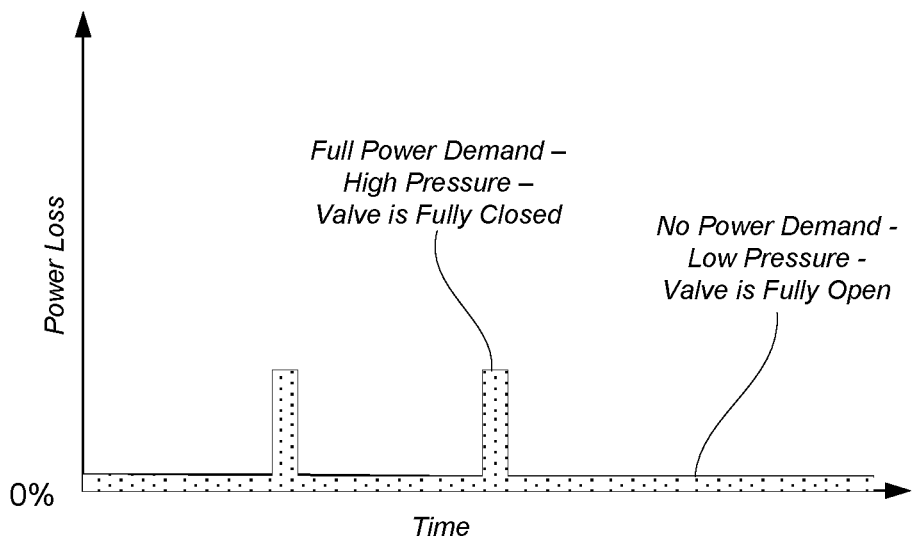

As noted above, the first operating regime is more common for many hydraulic systems than other operating regimes. For example, power steering boosted is rarely needed while driving and primarily used for maneuvering the car at low speeds. As such, power losses in the first operating regime tend to be more important than in other regime to achieve lowest overall energy losses as will now be explained with reference to FIGS. 5A and 5B. Specifically, FIG. 5A illustrates power losses over time in a hydraulic system operated with the constant maximum pump speed. FIG. 5B illustrates power losses over time in a hydraulic system operated with a pump speed controlled based on the position of the hydraulic servo-control valve. For simplicity, only limit operating regimes (i.e., the valve fully open or the valve fully closed) are captures in these plots. Even though power losses when the valve fully closed are substantially the same for both systems, this condition rarely occurs. On the other hand, power losses when the valve fully open are substantially less for the variable speed system (FIG. 5B) than the constant speed system (FIG. 5A). Furthermore, this regime being more frequent results in substantially less energy losses for the variable speed system than the constant speed system represented by the shaded areas under the plots.

Hydraulic System Examples

Figure 6A:
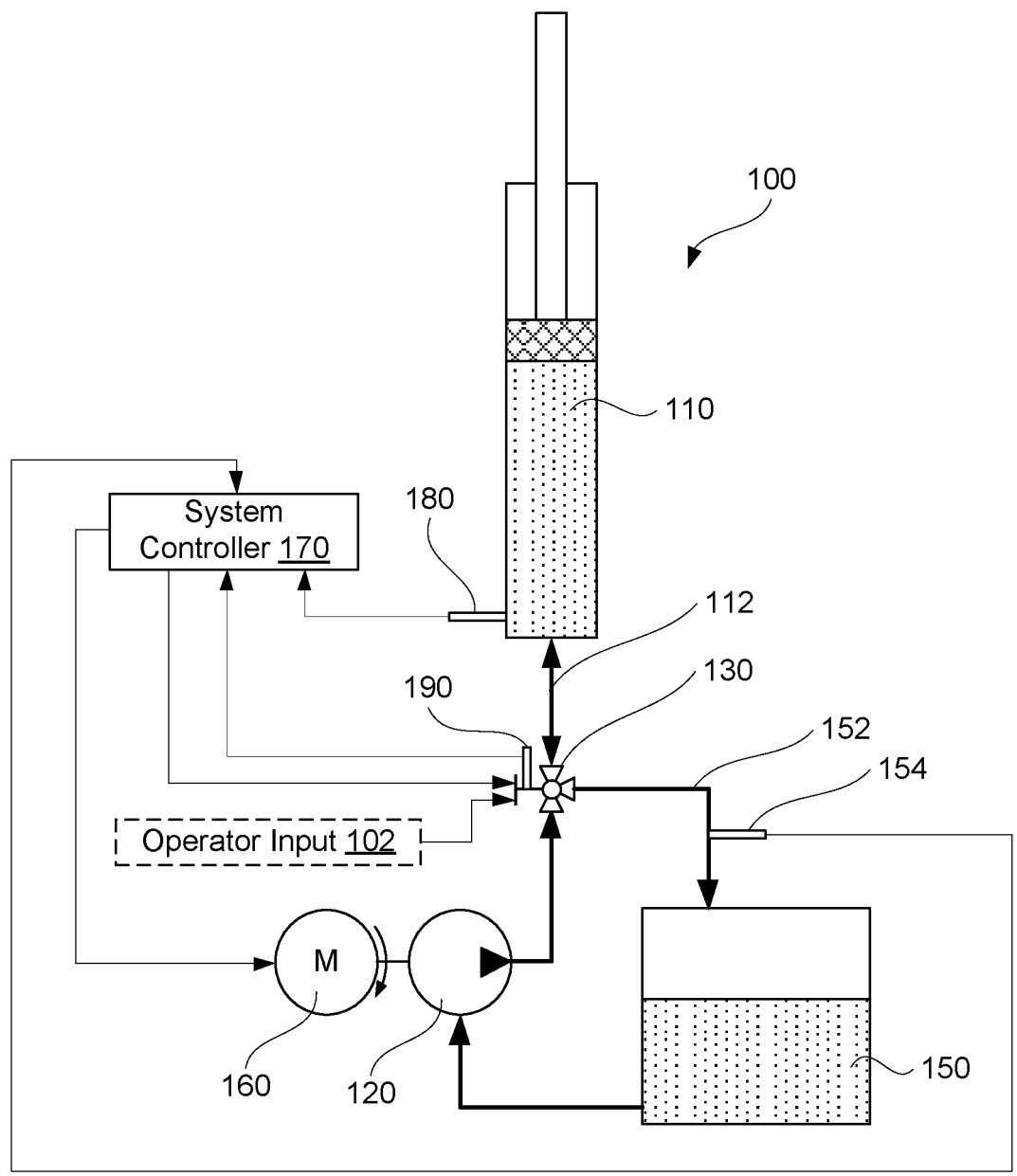
FIG. 6A is a schematic representation of a hydraulic system comprising a variable speed drive coupled to a hydraulic pump, in accordance with some embodiments.

To achieve and control variable pump speed capabilities, hydraulic system 100 may include various components that are not present in constant speed counterparts as will now be described with reference to FIG. 6A. Specifically, FIG. 6A is a schematic representation of hydraulic system 100 comprising variable speed drive 160 coupled to hydraulic pump 120. Variable speed drive 160 can be an electrical motor or any other suitable drive. Variable speed drive 160 may be connected directly to hydraulic pump 120 or through a set gear mechanism. As such, the speed of hydraulic pump 120 may be the same as the speed of variable speed drive 160 or the ratio of these two speeds may be a set value. A such, the pump speed and drive speed are used interchangeably in this document.

Variable speed drive 160 may be controlled by system controller 170. Specifically, the speed of variable speed drive 160 is controlled by system controller 170 based on the position of hydraulic servo-control valve 130. Hydraulic servo-control valve 130 may be controlled by an operator (e.g., by a torque applied to a steering wheel) or some other means. Hydraulic servo-control valve 130 directs the fluid pumped by hydraulic pump 120 to hydraulic actuator 110, fluid reservoir 150, or both depending on the position of hydraulic servo-control valve 130.

System controller 170 may determine this position based on the input from valve position sensor 190. Alternatively, system controller 170 may determine the valve position based the flow rates in different lines connected to hydraulic servo-control valve 130. For example, flow meter 154 may be installed in bypass line 152. If there is no flow in bypass line 152 and the speed of variable speed drive 160 is greater than zero, then hydraulic servo-control valve 130 is in its fully closed position. If the flowrate through bypass line 152 is the same as the flow generated by hydraulic pump 120 (and determined based on the speed of variable speed drive 160), then hydraulic servo-control valve 130 is in its fully open position. Furthermore, A ratio of the flowrate through bypass line 152 to the flow generated by hydraulic pump 120 may be used to determine all intermediate positions of hydraulic servo-control valve 130.

In some embodiments, system controller 170 may determine the valve position based on the pressure-drive speed response of hydraulic system 100 as further described below with reference to FIG. 7. One input of the pressure-drive speed response is provided by pressure sensor 180 measuring pressure in hydraulic actuator 110 or in actuator line 112.

In some embodiments, system controller 170 can learn parameters of overall hydraulic system 100 and apply various predictive algorithms based in these parameters. For example, system controller 110 may be able to predict the required drive speed in order to keep hydraulic servo-control valve 130 in a desired position, e.g., close to fully closed position. In some embodiments, other inputs, such as an input from a steering angle sensor, may be used. The input from the steering angle sensor may be used to determine the steering wheel rotation rate, which may indicate the current operating position on the pressure change curve. Another input may come from a vehicle speed sensor. One having ordinary skills in the art would understand that different hydraulic power boosts would be needed for vehicle steering at different speeds with more boost needed at lower speed and more boost needed at higher speeds.

Figure 6B:
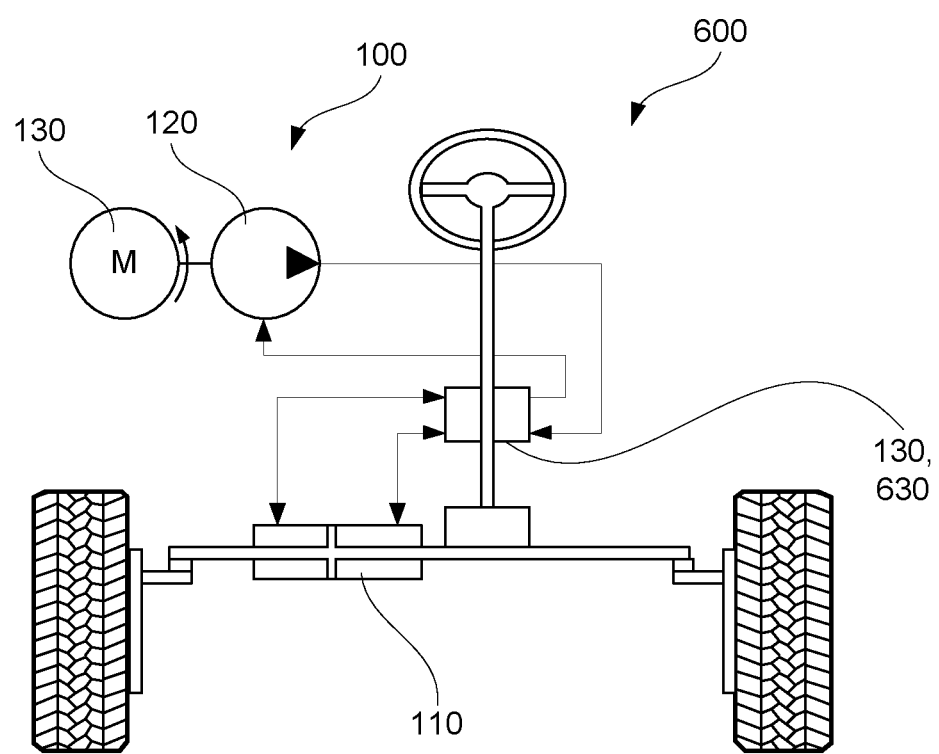
FIG. 6B is a schematic representation of a hydraulic power steering system including the hydraulic system described herein, in accordance with some embodiments.

Hydraulic system 100 may be a part of a higher level system, such as a hydraulically boosted steering system as schematically shown in FIG. 6B. Specifically, FIG. 6B is a schematic representation of hydraulic power steering system 600, which includes hydraulic system 100 described herein. For example, hydraulic actuator 110 of system hydraulic 100 may also a part of rack and pinion unit. Hydraulic servo-control valve 130 may be a rotary control valve 630 of hydraulic power steering system 600.

Examples of Method of Operating Hydraulic System

Figure 7:
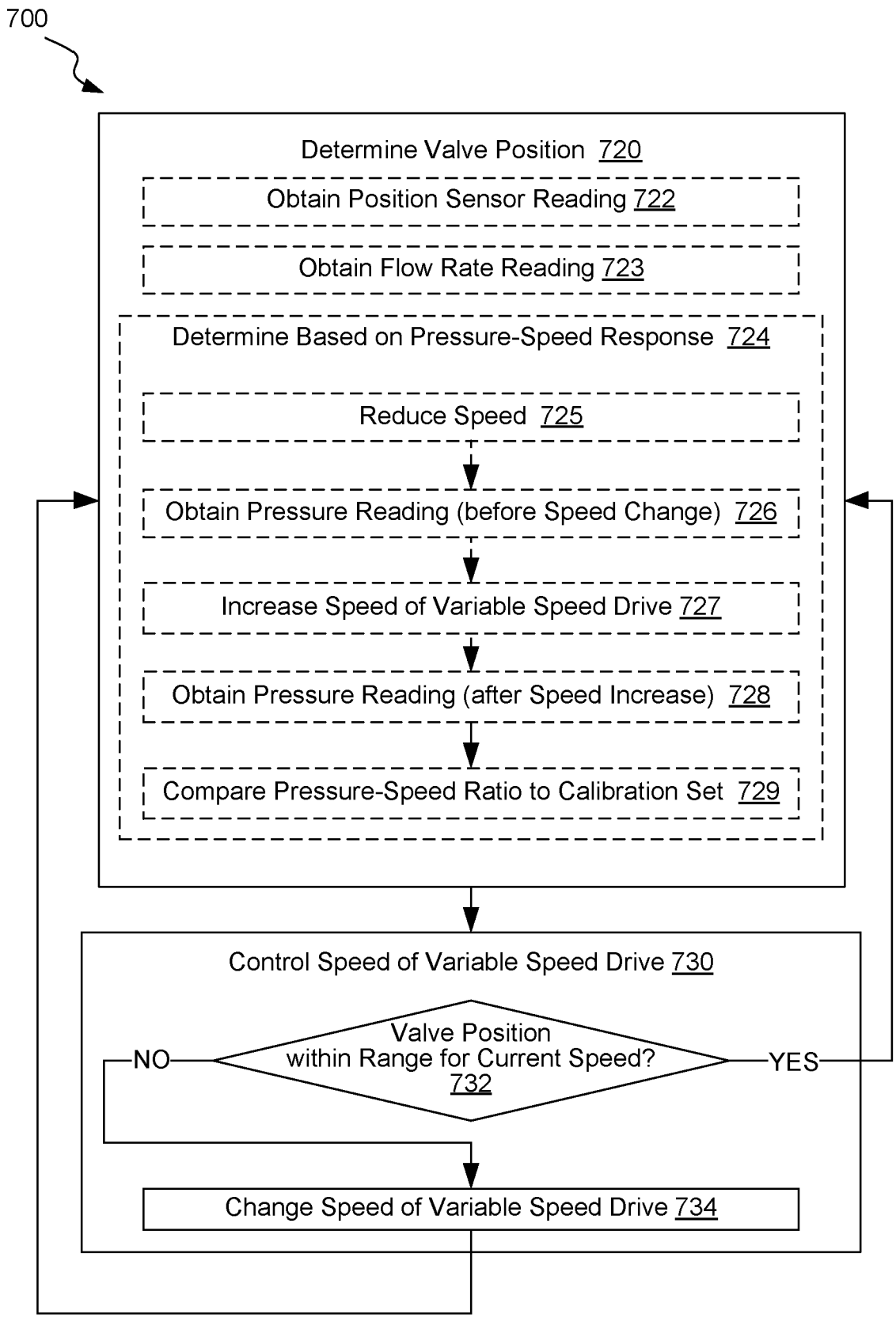
FIG. 7 is a process flowchart corresponding to a method of operating a hydraulic system, in accordance with some embodiments.

FIG. 7 is a process flowchart corresponding to method 700 of operating a hydraulic system, in accordance with some embodiments. Various examples of the system are described above with reference to FIG. 5. For example, the system comprises a variable speed drive coupled to a hydraulic pump. The hydraulic system also comprises a hydraulic servo-control valve controlling the flow of hydraulic fluid from the hydraulic pump to a hydraulic actuator of the hydraulic system. In some embodiments, the hydraulic system also comprises a system controller for performing some operations of method 700 as further described below.

In some embodiments, method 700 comprises determining the position of the hydraulic servo-control valve of the hydraulic system during operation 720. This determining operation may comprise obtaining the reading of the valve position sensor as reflected in FIG. 7 by optional block 722. The reading may be sent to the system controller. Alternatively, the valve position may be determined based on one or more flowrate readings as schematically shown by block 723. For example, the flowrate in the bypass line may be analyzed together the drive speed to determine the valve position. Furthermore, the valve position may be determined using pressure-drive speed response of the hydraulic system as reflected in FIG. 7 by optional block 724 and will now be described in more details.

The pressure-drive speed response approach utilized during operation 724 may be based on an inertia associated with the hydraulic actuator and, in some cases, external components contacting the actuator (e.g., a load supported by the actuator). Since the valve position determines a portion of the total flow directed the actuator, monitoring pressure changes in the actuator in response to changes in the total flow rate can be used to determine the valve position as will now be described.

Specifically, operation 724 involves obtaining a first pressure of the hydraulic fluid as reflected by block 726. In some embodiments, the speed is first reduced (obtaining the first pressure) as, for example, is shown by block 725 in FIG. 7. The pressure may be measured directly in the hydraulic actuator or in a line connecting the actuator to the valve. Measuring the pressure after the hydraulic servo-control valve allows to focus on the actuator response and eliminate noise from the bypass line. It should be noted that the first pressure corresponds to the first speed of the variable speed drive, which may be zero or any other value.

Operation 724 proceeds with increasing the speed of the variable speed drive from the first speed to a second speed as reflected by block 727. The increase (i.e., the difference between the second speed and the first speed) may be between about 1% and 20% of the maximum operating speed or, more specifically, between 5% and 10%. In some embodiments, the increase depends on the first speed, such that the higher first corresponding to a lower increase. For example, if the first speed is at or greater than 75% of the maximum operating speed, then the increase may be less than 10% or even less than 5% of the maximum operating speed. If the first speed is at or less than 25% of the maximum operating speed, then the increase may be greater than 5% of the maximum operating speed or even greater than 10% of the maximum operating speed. It should be noted that the second speed may not exceed the maximum operating speed.

Operation 724 proceeds with obtaining the second pressure of the hydraulic fluid as reflected by block 728. The second pressure corresponds to the second speed of the variable speed drive. More specifically, the second pressure may be the maximum pressure after the speed is increased to the second speed level and until any further speed changes. As further described below with reference to FIG. 9, the pressure may fluctuate after the speed exchange due to inertia, increase in flow resistance, and other factors. The second pressure is measured at the same location as the first pressure.

Operation 724 proceeds with determining a differential pressure-speed ratio as reflected by block 729. Specifically, this ratio is determined by dividing the pressure differential by the speed differential. The pressure differential is the difference between the first pressure and the second pressure. The speed differential is the difference between the first speed and the second speed. As such, the differential pressure-speed ratio may be represented by the following formula:

$$\text{Differential Pressure Speed Ratio} = \frac{\text{Second Pressure} - \text{First Pressure}}{\text{Second Speed} - \text{First Speed}}$$

Operation 724 proceeds with comparing the differential pressure-speed ratio to calibration values corresponding to different valve positions as reflected by block 729. These calibration values may be presented as a database, a profile, or some other format.

Figure 8:
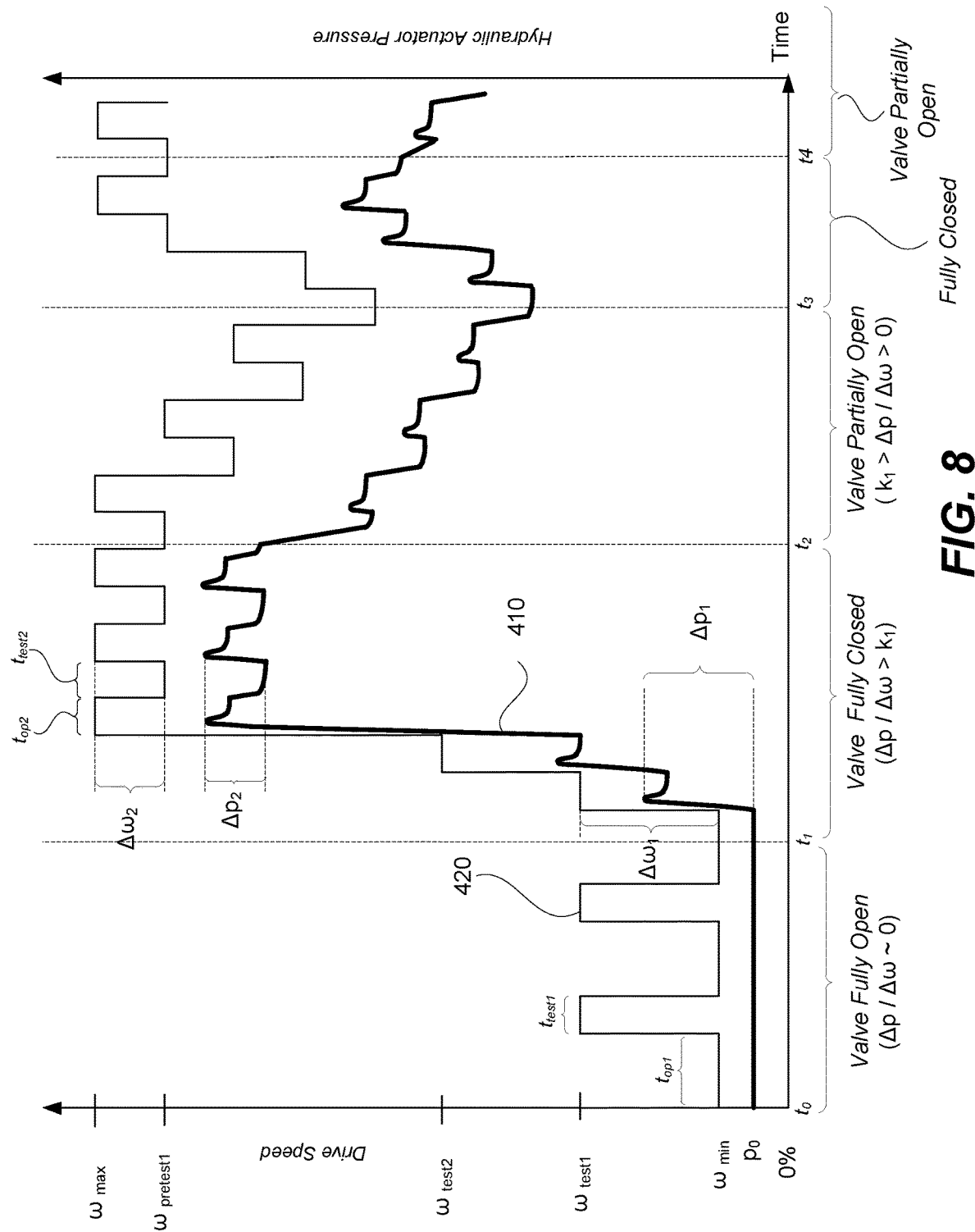
FIG. 8 illustrates plots of drive speed and hydraulic actuator pressure over time while operating the hydraulic system, in accordance with some embodiments.

An example of the pressure-drive speed response and operation 724 will now be explained with reference to FIG. 8, which illustrates plots of variable drive speed 420 and hydraulic actuator pressure 410 over time. During the initial period ($t_0$ to $t_1$), the hydraulic valve is fully open and no fluid is directed to the actuator. The variable drive may be operated at a set minimal speed ($\omega_{min}$) during the operating interval ($t_{op}$) and may be increased to a first test level ($\omega_{test1}$) during the test interval ($t_{test}$). The speed increase may be expressed as $\Delta\omega_1=\omega_{test1}-\omega_0$. Since no fluid is directed to the hydraulic actuator during the initial period ($t_0$ to $t_1$), the increase in speed 420 does not cause any changes in pressure 410 and pressure 410 remains constant at $p_0$ level. This pressure response ($\Delta p/\Delta\omega=0$) is interpreted as the hydraulic valve being fully open. Variable drive speed 420 is returned back to the set minimal speed ($\omega_{min}$). The process of increasing speed 420 to the first test level ($\omega_{test1}$) and returning back to the set minimal speed ($\omega_{min}$) may be \ repeated unto some different pressure response is detected.

Figure 9:
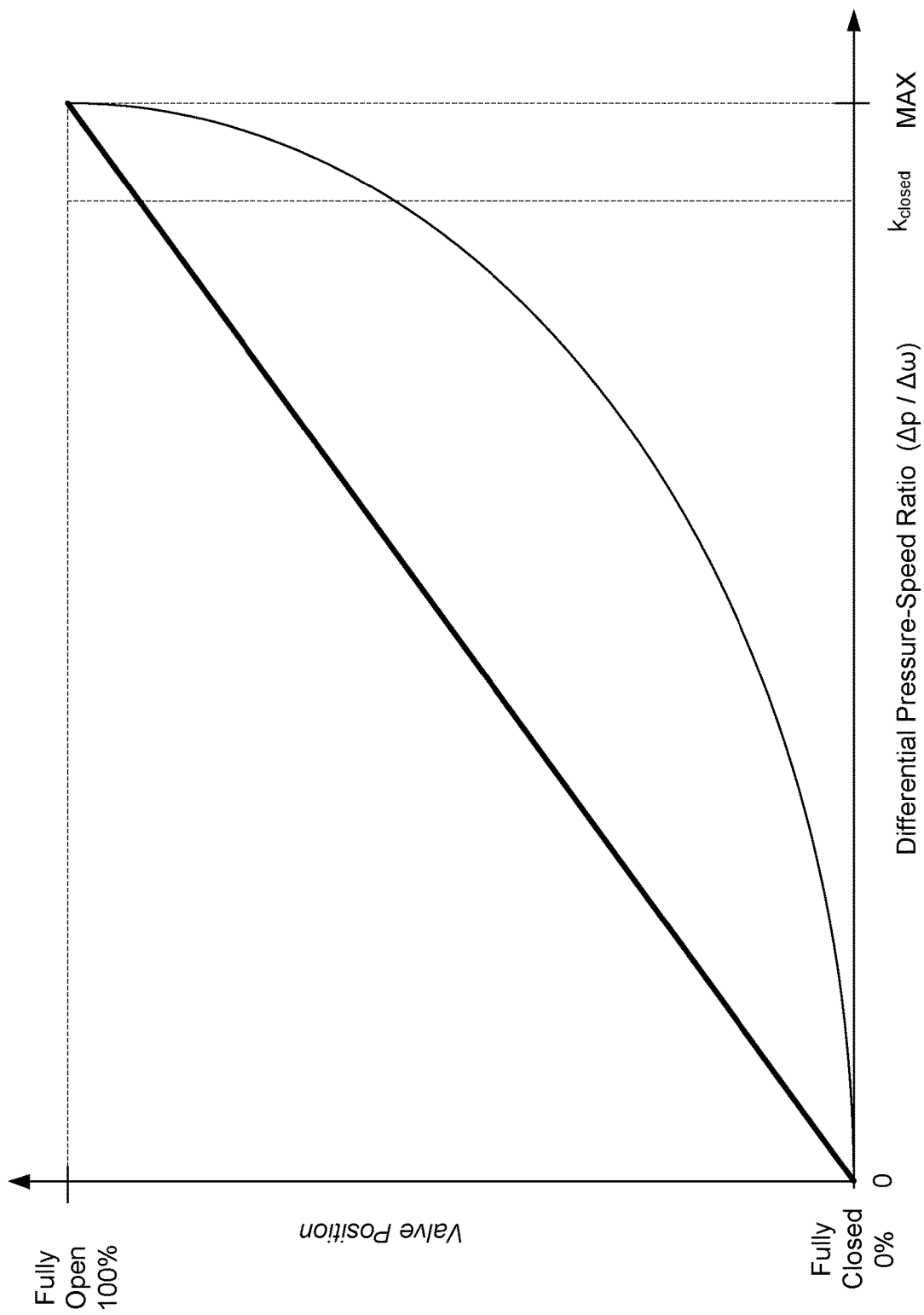
FIG. 9 illustrates two examples of valve position profiles as a function of differential pressure-speed ratios ($\Delta p/\Delta \omega$), in accordance with some embodiments.

In the next period ($t_1$ to $t_2$), the hydraulic valve is fully closed, and all fluid is directed to the actuator. Transitioning from the initial period ($t_0$ to $t_1$), the variable drive may be still operated at a set minimal speed ($\omega_{min}$) or some other speed depending on the previous states of the hydraulic valve that is used to control speed 420. Continuing with the example when the variable drive is first operated at a set minimal speed ($\omega_{min}$), speed 420 is increased to a first test level ($\omega_{test1}$) during the test interval. Since all fluid is directed to the hydraulic actuator, the speed increase will cause the pressure increase ($\Delta p_1$) in the actuator. It is important to note that for the same speed increase, the pressure increase in the actuator will be greater when the hydraulic valve is fully closed (and all fluid is directed to the actuator) rather than partially open (and some fluid is allowed into the bypass line). In other words, the differential pressure-speed ratio ($\Delta p/\Delta\omega$) may be used to determine how much the valve is open. As noted above, this ratio is equal to zero ($\Delta p/\Delta\omega=0$) for the valve being fully open and at its maximum ($\Delta p/\Delta\omega=\text{MAX}$) when the valve is fully closed. FIG. 9 illustrates two examples of valve position profiles as a function of differential pressure-speed ratios ($\Delta p/\Delta\omega$). The valve position is expressed as a percentage with 0% corresponding to the valve being fully open and 100% corresponding to the valve being fully closed. These profiles may depend on various factors associated with the hydraulic system.

Based on the value of the differential pressure-speed ratio ($\Delta p/\Delta\omega$) after the speed increase, the speed may be further adjusted. For example, if the value corresponds to the valve being fully closed, the speed may be increased to its maximum value ($\omega_{max}$). This increase to the maximum speed value may be performed as soon as the first value of the differential pressure-speed ratio corresponds to the valve being fully closed. Alternatively, the increase to the maximum speed value may be performed after two or more consecutive values of the differential pressure-speed ratio corresponds to the valve being fully closed. Referring to the example presented in FIG. 9, the maximum operating speed is set after two consecutive values are at or above the threshold corresponding to the valve being fully closed. Specifically, when speed 420 is first increased to the first test level ($\omega_{test1}$) and when the differential pressure-speed ratio ($\Delta p/\Delta\omega$) is at or greater than the threshold ($\Delta p/\Delta w > k_{closed}$), the speed may be simply kept at the first test level until performing a further speed increase. Speed 420 is then increased to the second test level ($\omega_{test2}$) and the differential pressure-speed ratio ($\Delta p/\Delta\omega$) is checked again. In this example, the ratio is still at or greater than the threshold ($\Delta p/\Delta w > k_{closed}$) and the maximum speed is used as a result.

In an alternative example, after the speed is increased to the first test level ($\omega_{test1}$) it may be brought back to the minimal speed ($\omega_{min}$) even when the differential pressure-speed ratio ($\Delta p/\Delta \omega$) is greater than the threshold ($\Delta p/\Delta w > k_{closed}$). The second test cycle is performed by increasing the speed again from the minimal speed ($\omega_{min}$) to, for example, the first test level ($\omega_{test1}$). In this example, the starting speeds for multiple sequential test of the differential pressure-speed ratio are the same.

Returning to FIG. 9, after operating at the maximum speed for some operating interval ($t_{op2}$), the speed is decreased to a pretest level ($\omega_{pretest1}$) before performing the actual test. It should be noted that this test involves measuring momentum of the hydraulic actuator, which is more effectively captured by the speed increase rather than the speed decrease. The speed is then increased back to the maximum operating level ($\omega_{max}$) and the differential pressure-speed ratio ($\Delta p_2/\Delta \omega_2$) is determined. If this ratio is greater than the threshold corresponding to the valve being fully closed ($\Delta p_2/\Delta \omega_2 > k_{closed}$), then the process of decreasing the speed to the first pretest level ($\omega_{pretest1}$) and increasing the speed back to the maximum level ($\omega_{max}$) is repeated. Two such cycles are schematically shown in FIG. 9 during the period $t_1$ to $t_2$. However, when the ratio is less than the threshold ($\Delta p_2/\Delta \omega_2 < k_{closed}$), then the speed is decreased to a lower pretest level ($\omega_{pretest2}$) as, for example, schematically shown in FIG. 9 during the period $t_2$ to $t_3$. Furthermore, during the test, the speed is increased to a level lower the maximum. In some embodiments, the ratio may be less than the closed threshold ($\Delta p_2/\Delta \omega_2 < k_{closed}$) but greater than zero indicating that the valve is partially open. One having ordinary skill in the art would understand that multiple different thresholds may be used to determine the position of the hydraulic servo-control valve.

In some embodiments, the minimum operating speed ($\omega_{min}$) of the drive is set at to between 1% and 5% of the maximum operating speed or, more specifically, at 2%. The speed increase ($\Delta \omega$) may be between about 2% and 20% of the maximum operating speed or, more specifically, between 5% and 15%, such as about 10% when the starting speed (prior to increase) is less than 50% of the maximum operating. Alternatively, if the starting speed (prior to increase) is greater than 50% of the maximum operating, then speed increase ($\Delta \omega$) may be less, such as between about 0.5% and 5% of the maximum operating speed or, more specifically, between 1% and 3%, such as about 2%. This difference in the speed increase may be used to avoid inadequate power supplied by the hydraulic system. The duration of an interval prior to increase the speed ($t_{op}$) may be between about 100 milliseconds and 500 milliseconds or, more specifically, every 200 milliseconds. Similarly, the duration of an interval prior to increase the speed ($t_{test}$) may be between about 100 milliseconds and 500 milliseconds or, more specifically, every 200 milliseconds. These durations may be selected based on the control dynamics, power demand dynamics, drive and pump dynamics, and other factors.

Returning to FIG. 7, method 700 may then proceed with controlling speed of the variable speed drive during operation 730. As noted above, the speed is controlled based on the position of the hydraulic servo-control valve. Controlling the speed of the variable speed drive controls the amount of the hydraulic fluid pumped by the hydraulic pump.

Specifically, operation 730 may involve comparing the current speed to a control speed for the determined valve position. The control speed may be identified from one of various speed-valve position profiles described above with reference to FIGS. 2B-2D. In some embodiments, a look up table or, more generally, a database may be used to identify the control speed. If there is a difference between the current and control speed or, more generally, if the difference is greater than a control threshold, then the current speed of the variable speed drive may be changed to match the control speed.

CONCLUSION

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses. Accordingly, the present embodiments are to be considered as illustrative and not restrictive.

What is claimed is:

1. A method of operating a hydraulic system comprising a variable speed drive coupled to a hydraulic pump, the method comprising:
    determining position of a hydraulic servo-control valve of the hydraulic system,
        wherein the hydraulic servo-control valve controls flow of hydraulic fluid from the hydraulic pump to a hydraulic actuator of the hydraulic system; and
    controlling speed of the variable speed drive,
        wherein the speed is controlled based on the position of the hydraulic servo-control valve,
        wherein controlling the speed of the variable speed drive controls amount of the hydraulic fluid pumped by the hydraulic pump, and
        wherein controlling the speed of the variable speed drive comprises decreasing the speed if the position of the hydraulic servo-control valve is less than 50% of a fully closed position.

2. The method of claim 1, wherein controlling the speed of the variable speed drive comprises changing a current speed to a speed level corresponding to the position of the hydraulic servo-control valve.

3. The method of claim 1, wherein determining the position of the hydraulic servo-control valve and controlling the speed of the variable speed drive are repeated continuously at a set frequency.

4. The method of claim 3, wherein the set frequency is greater than 1 Hz.

5. The method of claim 1, wherein determining the position of the hydraulic servo-control valve receiving output from a position sensor coupled to the hydraulic servo-control valve.

6. The method of claim 1, wherein determining the position of the hydraulic servo-control valve comprises receiving output from a flow sensor installed in an actuator line or a bypass line.

7. The method of claim 1, wherein determining the position of the hydraulic servo-control valve is based on a pressure-drive speed response of the hydraulic system.

8. The method of claim 7, wherein determining the position of the hydraulic servo-control valve based on the pressure-drive speed response of the hydraulic system comprises:
    obtaining a first pressure of the hydraulic fluid in the hydraulic actuator,
        wherein the first pressure corresponds to a first speed of the variable speed drive;
    increasing a speed of the variable speed drive from the first speed to a second speed;
    obtaining a second pressure of the hydraulic fluid at the location after the hydraulic pump, wherein the second pressure corresponds to the second speed of the variable speed drive;

determining a differential pressure-speed ratio of a pressure differential to a speed differential, wherein the pressure differential is a difference between the first pressure and the second pressure, and wherein the speed differential is a difference between the first speed and the second speed; and comparing the differential pressure-speed ratio to a calibration set for the hydraulic system.

9. The method of claim 8, further comprising, prior to obtaining the first pressure, reducing a current speed of the variable speed drive to the first speed.

10. The method of claim 8, wherein the speed differential depends on the first speed.

11. The method of claim 8, wherein the first pressure is a lowest pressure at the first speed prior to increasing the speed.

12. The method of claim 8, wherein the second pressure is a highest pressure at the second speed after increasing the speed.

13. The method of claim 8, wherein the calibration set is one of a function or a data set.

14. A method of operating a hydraulic system comprising a variable speed drive coupled to a hydraulic pump, the method comprising:

determining position of a hydraulic servo-control valve of the hydraulic system, wherein the hydraulic servo-control valve controls flow of hydraulic fluid from the hydraulic pump to a hydraulic actuator of the hydraulic system; and controlling speed of the variable speed drive, wherein the speed is controlled based on the position of the hydraulic servo-control valve, wherein controlling the speed of the variable speed drive controls amount of the hydraulic fluid pumped by the hydraulic pump, wherein controlling the speed of the variable speed drive comprises changing a current speed to a speed level corresponding to the position of the hydraulic servo-control valve, and wherein the speed level corresponding to the position of the hydraulic servo-control valve being fully closed is a maximum operating speed of the variable speed drive.

15. The method of claim 14, wherein the speed level corresponding to the position of the hydraulic servo-control valve being fully open is a minimum operating speed of the variable speed drive.

16. The method of claim 15, wherein the minimum operating speed is between about 1% and 10% of the maximum operating speed.

17. The method of claim 15, wherein the speed level corresponding to the position of the hydraulic servo-control follows a linear function of the position of the hydraulic servo-control extending between the minimum operating speed and the maximum operating speed.

18. The method of claim 15, wherein the speed level corresponding to the position of the hydraulic servo-control follows a non-linear function of the position of the hydraulic servo-control extending between the minimum operating speed and the maximum operating speed and extending closer to the minimum operating speed than a linear function.

19. The method of claim 14, wherein controlling the speed of the variable speed drive comprises decreasing the speed if the position of the hydraulic servo-control valve is less than 50% of a fully closed position.

20. A hydraulic system comprising:
a hydraulic actuator;
a bypass line;
a hydraulic servo-control valve operable to control a flow of hydraulic fluid between the hydraulic actuator and the bypass line;
a hydraulic pump coupled to the hydraulic servo-control valve and operable to pump the hydraulic fluid to the hydraulic servo-control valve;
a variable speed drive coupled to the hydraulic pump and operable to drive the hydraulic pump; and
a system controller operable to control speed of the variable speed drive based on position of the hydraulic servo-control valve and to decrease the speed if the position of the hydraulic servo-control valve is less than 50% of a fully closed position.

* * * * *